United States Patent [19]

Ackeret

[11] E Patent Number: Re. 32,738

[45] Reissued Date of Patent: Aug. 30, 1988

[54] PICTURE VIEWER

[75] Inventor: Peter Ackeret, Küsnacht, Switzerland

[73] Assignee: Licinvest AG, Chur, Switzerland

[21] Appl. No.: 114,233

[22] Filed: Oct. 29, 1987

Related U.S. Patent Documents

Reissue of:

[64] Patent No.: 4,550,516
Issued: Nov. 5, 1985
Appl. No.: 560,385
Filed: Dec. 12, 1983

[30] Foreign Application Priority Data

Dec. 13, 1982 [DE] Fed. Rep. of Germany ..... 3246103

[51] Int. Cl.[4] ..... G09F 11/30

[52] U.S. Cl. ..... 40/513; 40/511; 40/490

[58] Field of Search ..... 40/513, 122, 10 R, 511, 40/490, 380

[56] References Cited

U.S. PATENT DOCUMENTS

| | | | |
|---|---|---|---|
| 535,635 | 3/1895 | Stone | 40/509 |
| 2,867,051 | 1/1959 | Taylor | 40/509 |
| 2,919,509 | 1/1960 | Strandberg | 40/63 |
| 3,377,727 | 4/1968 | Weggeland | 40/79 |
| 3,878,632 | 4/1975 | Berggren et al. | 40/152 |
| 4,057,920 | 11/1977 | Weggeland | 40/79 |
| 4,173,838 | 11/1979 | Antos | 40/366 |
| 4,238,899 | 12/1980 | Ackeret | 40/490 |
| 4,241,528 | 12/1980 | Ackeret | 40/513 |
| 4,241,529 | 12/1980 | Baur | 40/490 |
| 4,242,817 | 1/1981 | Ballard | 40/152.1 |
| 4,242,820 | 1/1981 | Ackeret | 40/490 |
| 4,245,417 | 1/1981 | Ackeret | 40/513 |
| 4,259,802 | 4/1981 | Ackeret | 40/490 |
| 4,376,348 | 3/1983 | Ackeret | 40/490 |
| 4,413,435 | 11/1983 | Baur | 40/155 |
| 4,458,434 | 7/1984 | Ackeret | 40/513 |

FOREIGN PATENT DOCUMENTS

| | | | |
|---|---|---|---|
| 1772198 | 1/1971 | Fed. Rep. of Germany . | |
| 2212135 | 11/1972 | Fed. Rep. of Germany . | |
| 2457759 | 6/1976 | Fed. Rep. of Germany . | |
| 2742345 | 3/1979 | Fed. Rep. of Germany . | |
| 490390 | 8/1954 | Italy . | |
| 629845 | 12/1961 | Italy | 40/107 |
| 1059689 | 2/1967 | United Kingdom . | |
| 1339678 | 12/1973 | United Kingdom . | |
| 1402062 | 8/1975 | United Kingdom . | |

*Primary Examiner*—Gene Mancene
*Assistant Examiner*—Wenceslao J. Contreras
*Attorney, Agent, or Firm*—Jeffrey H. Ingerman

[57] ABSTRACT

Disclosed is a picture viewer for viewing a stack of pictures sequentially through a viewing window. The picture viewer comprises a housing member, a slider member, a bias means for urging the stack of pictures against the viewing window, and an exchange means for sequentially changing the picture that is presented at the viewing window. The exchange means comprises: (a) a retentive element to hold one picture in the housing member when the slider member is moved out of the housing member and (b) a separator bar which pushes the remainder of the stack out of the housing when the slider member is moved out of the housing. To permit relatively smooth operation of the picture viewer, the bias means is mounted on the slider.

16 Claims, 2 Drawing Sheets

1
36
3
5
32
34
13''
6
8'
30
13'
4
5

5
13''
8'
3
11
6
13'
38
36
13'
32
34
4
6
6
30
2
26
1

1
3
13''
6
8'
36
13'
32
34
11
30
2
32
36
34
8'
13'
7
13''

5
6
13''
8'
3
11
13'
32
36
4
40
34
51
30
44
42
2
51
1
56

PICTURE VIEWER

Matter enclosed in heavy brackets [ ] appears in the original patent but forms no part of this reissue specification; matter printed in italics indicates the additions made by reissue.

BACKGROUND OF THE INVENTION

The present invention relates to a picture viewer for viewing sequentially pictures in a stack. The picture viewer includes an exchange mechanism which cylically exchanges the picture in the stack that is presented for viewing at a viewing window.

Picture viewers for sequentially viewing a stack of pictures are described in U.S. Pat. No. 4,259,802 (the '802 patent). Picture viewers of the type described in the '802 patent are discussed in some detail in my U.S. patent application Ser. No. 560,384, filed concurrently herewith, the disclosure of which is incorporated herein by reference.

Briefly, the picture viewer of the '802 patent comprises a housing with a viewing window and a slider or drawer which may be reciprocated into and out of the housing parallel to the plane of the viewing window. The housing has a spring bias system adapted to urge a stack of pictures against the window when the slider is positioned in the housing.

The slider is provided with a separator bar adapted to force all but the top or bottom picture in the stack of pictures out of the housing when the slider is moved out of the housing. A retentive coating on the spring bias system retains the uppermost or lowermost picture of the stack in the housing upon the outward stroke of the slider thus separating that picture from the rest of the stack of pictures. On the return stroke of the slider, the separated picture is returned to the opposite end of the stack from which it was removed.

On the outward and return strokes of the slider, the separator bar passes first over and then under the separated picture, or vice versa, depending on whether the top or bottom picture in the stack is removed from the stack on the outward stroke. Appropriate spaces are, therefore, provided above and below the separator bar to accommodate the separated picture on the outward and return strokes of the slider.

By combining the spring bias system and the retentive coating into one element in the housing, as described above, certain advantages with respect to the ease of manufacture of the picture viewer may be achieved. However, the viewer described above also has certain drawbacks. In particular, upon each outward stroke of the slider, the separator bar must engage and suppress the spring bias system. The forces necessary for such suppression vary considerably over the length of the outward stroke. As a result, the user has the feeling of "jamming" at certain positions in that stroke. Thus, a design in which a relatively uniform force is required to move the slider out of the housing would be highly desirable.

SUMMARY OF THE INVENTION

It is an object of the invention to provide an improved picture viewer of the type described above in which a relatively uniform force is required to move the slider out of the housing.

This is achieved in the present invention by providing the bias means in the slider member with the result that the separator bar of the slider member need not suppress the bias means when the slider member is moved out of the housing member.

In particular, the picture viewer of the present invention comprises, inter alia, a housing member and a slider member. The housing member is adapted to accommodate a stack of pictures of substantially equal size and has a top wall, a bottom wall opposite the top wall, side walls, a rear end wall, and an open front end. The top wall of the housing member includes a viewing window through which the top picture in the stack of pictures is viewed.

The slider member is adapted to move into and out of the open front end of the housing member parallel to the plane of its viewing window. A bias means (e.g., a spring) is mounted in the slider member to urge the topmost picture in the stack into position for viewing when the slider member is moved into the housing member.

The picture viewer of the present invention also includes a picture exchange means which cooperates with other structure in the picture viewer to achieve a cyclic exchange of pictures to be viewed through the viewing window. This picture exchange means includes (a) a separator bar adapted to move pictures in the stack of pictures out of the housing member when the slider is moved out of that member, and (b) a retentive element in the housing member adapted to engage either the top or bottom picture in the stack of pictures in the housing member to retain that picture in the housing member when the slider is moved outwardly. The separator bar and retentive element cooperate with the other structure in the picture viewer so that, in use, when the slider member is moved out of the housing member, the top or bottom picture is separated from the stack of pictures and, when the slider member is moved back into the housing member, the first picture is returned to the opposite end of the stack from which it was separated.

Because the separator bar of the slider member need not suppress the bias means when the slider member is moved out of the housing member, a relatively smooth passage of the slider member out of the housing member is achieved.

The picture viewer of the present invention preferably also includes stop means for holding the corners of a stack of pictures against the force exerted by the bias means in the slider member when the slider member is moved out of the housing member. Preferably, the stop means includes means that are movable to allow for the insertion and removal of a stack of pictures into and out of the slider member when the slider member is withdrawn from the housing member.

In a preferred embodiment of the invention, there is provided disabling means for suppressing the portion of the bias means adjacent to the separator bar when the slider member is moved out of the housing member. By suppressing the bias means in this manner, the end of the stack of pictures closest to the separator bar moves downwardly under the force of gravity, away from the top of the slider member. The space thereby created permits the unobstructed passage of the separated picture onto the top of the stack of pictures in the slider member when the slider member is moved back into the housing member.

Alternatively, as will be described in more detail below, suppressing the bias means in the above manner permits the separated picture to be returned to the bottom of a stack of pictures in the slider member and above the suppressed bias means.

DETAILED DESCRIPTION OF THE PREFERRED EMBODIMENTS

Figure 2:
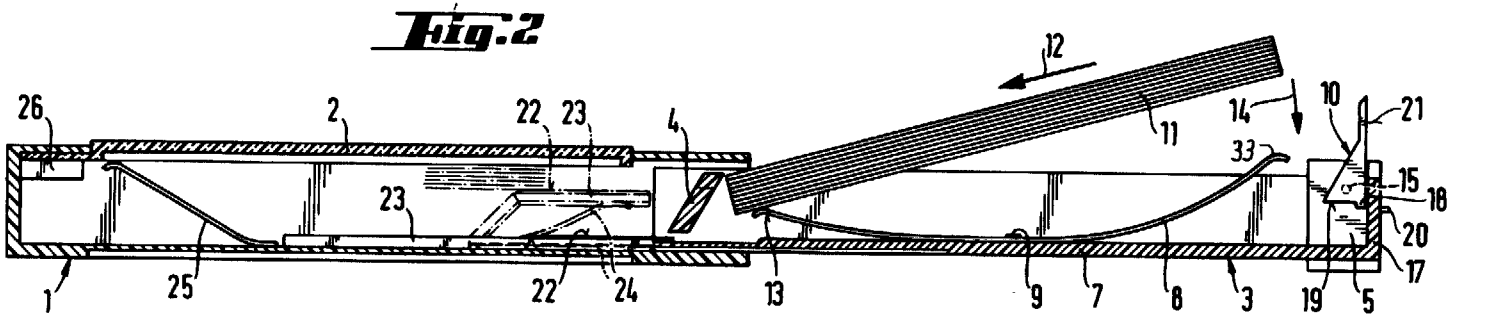
FIG. 2 is a sectional view taken along line 2—2 of FIG. 1, but with the full length of the slider member shown and with stop flaps displaced into a loading position.
Figure 3:
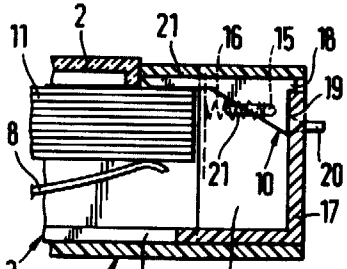
FIG. 3 is a sectional view taken along line 3—3 in FIG. 1, when the slider is moved into the housing.
Figure 1:
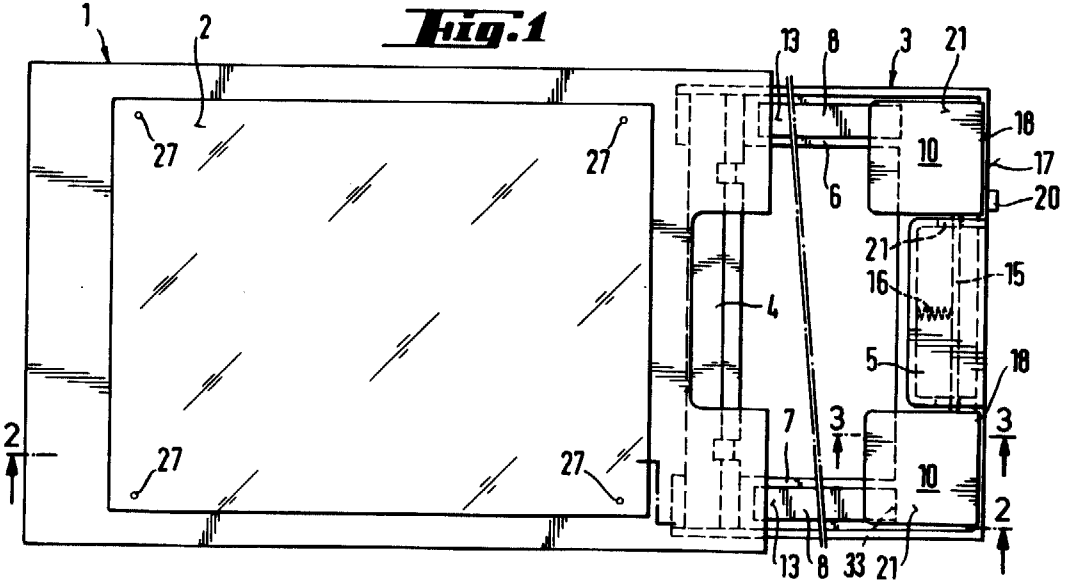
FIG. 1 is a partial plan view of a first embodiment of my invention, with the broken lines indicating that a portion of the picture viewer's slider member has been cut away.

A first embodiment of the picture of my invention is depicted in FIGS. 1, 2, and 3.

The picture viewer comprises a housing member 1 and a slider member 3. The housing member 1 is provided with a viewing window 2 made, for example, of a pane of transparent plastic material. The remainder of housing 1 may be injection molded from opaque plastic material.

The slider member 3 is slidable relative to the housing member 1 and comprises a grip portion 5 at its outer end, longitudinal struts 6 and 7 that extend in the direction of the movement of the slider, and a separator element in the form of a separator bar 4, extending between the struts 6 and 7 adjacent to the inner end of the slider.

Leaf springs 8 are mounted at the center 9 of each strut 6 and 7 by means of rivets or the like. As shown in FIG. 1, the length of leaf springs 8 is selected such that their distal ends 13 do not leave the housing 1 even when the slider is moved to its full extent out of the housing. The proximal ends 33 of springs 8 extend beneath stop flaps 10 when those flaps are in their closed position, as shown in FIG. 3.

FIGS. 1 and 3 show the operative position of stop flaps 10, i.e., their position when they act as a stop means for a stack of pictures 11 in the picture viewer. In this position, the user may reciprocate the slider member 3 into and out of the housing member 1 to move sequentially pictures from the bottom to the top of the stack of pictures.

If, however, it is desired to remove or insert a stack of pictures into or out of the picture viewer, flaps 10 may be pivoted about a shaft 15 to assume the "loading" position shown in FIG. 2. To load the viewer, stack 11 is aligned with the housing opening as shown in FIG. 2 and pushed inwardly as indicated by arrow 12, thereby depressing spring ends 13. The outer stack edge is then pushed downwardly, as shown by arrow 14, to depress spring ends 33 and to position the stack in front of the inner face of grip portion 5. Flaps 10 are then returned to their operative position.

Shaft 15 is received in slots 21 of grip portion 5 and is biased by coil spring 16 to the outermost ends of the slots 21. In the operative position, (a) edges 19 of flaps 10 engage the inner face of slider front wall 17 and (b) flap extensions 18 engage over the top edge of front wall 17.

In order to pivot flaps 10 into their loading position, a key 20 which is slidably received in slider front wall 17 is depressed to exert a force against flap edge 19 at a point below and offset with respect to shaft 15. The force exerted by the key: (a) first causes extension 18 to come free of front wall 17, which is made of a flexible material, and (b) then causes flaps 10 to pivot into the loading position. Spring 16 stabilizes the flaps in their loading position by forcing their top faces to engage the inner face of slider front wall 17.

The means to implement the cyclic exchange of pictures comprises a retentive element that is mounted in a central position on the bottom 30 of housing member 1 and a separator bar 4 that is mounted on the slider 3. The retentive element comprises a lever arm 23 having a high friction coating 22 on a part of its surface that faces window 2. When slider 3 is fully pushed into housing 1 (and assuming that a smaller number of pictures than shown in stack 11 is in the picture viewer), lever arm 23 will assume the position indicated in dashed lines in FIG. 2. Upon withdrawl of slider 3, coating 22 retains the lowermost picture of stack 11 in the housing while the remaining pictures are pushed outwardly on the slider struts 6 and 7 by separator bar 4. When the separator bar 4 engages the upwardly sloping portion of lever arm 23 on its outward stroke, arm 23 is pushed downwardly against the bias of spring 24 until it reaches a flat position where it will remain until separator bar 4 is returned into the housing 1.

With slider 3 fully withdrawn, an auxiliary spring 25 that is mounted in the housing urges the rear edge of the separated picture, i.e., the edge remote from the housing opening, upwardly toward window 2 and to a position in front of stop extensions 26, which are an integral part of the housing 1. The front end of the separated picture will then be presented in front of the inwardly facing bevel of separator bar 4. When slider 3 is pushed back into housing 1, the front end of the separated picture will "climb" up this bevel because the rear edge of the separated picture is engaged by stop extensions 26 and cannot yield. Consequently, during the return stroke of slider 3, the separator bar 4 passes under the separated picture onto the top of the stack of pictures in the slider. An appropriate clearance is provided between separator bar 4 and the top wall of housing 1 to permit this passage. Thus, upon each reciprocation cycle of slider 3, the lowermost picture at the beginning of the cycle becomes the uppermost picture at the end of the cycle.

Because springs 8 exert a force against the picture corners at the points indicated at 27, the uppermost picture in the stack will be presented to the viewer flat against the viewing window. Such a design is particularly useful for pictures in the form of photographic prints, which have a tendency to become non-planar during storage.

Springs 24 and 25 are designed to be relatively weak as compared to springs 8. For that reason, the frictional forces exerted upon the slider during its reciprocation are relatively slight in spite of the deflection of springs 24 and 25. It may be desired, however, to minimize the variation of such frictional forces even more by utilizing springs that exhibit a substantially constant bias irrespective of their degree of deflection.

In the embodiment depicted in FIGS. 1-3, leaf springs 8 urge the stack of pictures in the slider upwardly into engagement with the top wall of the housing during the return stroke of the slider. Because the separated picture must penetrate between the top wall of the housing and the uppermost picture of the stack in slider 3 during that return stroke, there is a risk that occasionally the separated picture will become jammed or damaged during the return stroke.

Figure 4:
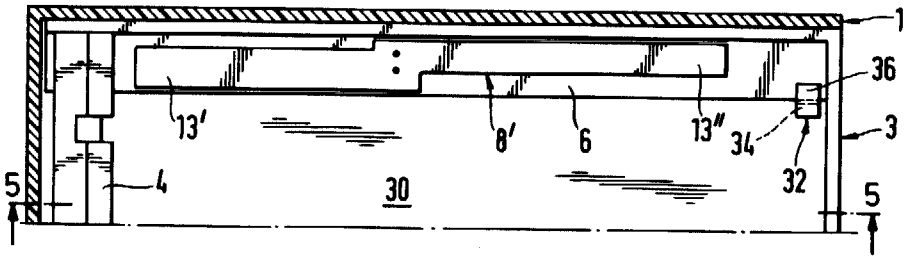
FIG. 4 is a partial plan view of a second embodiment of my invention, with the slider moved into the housing.
Figure 5:
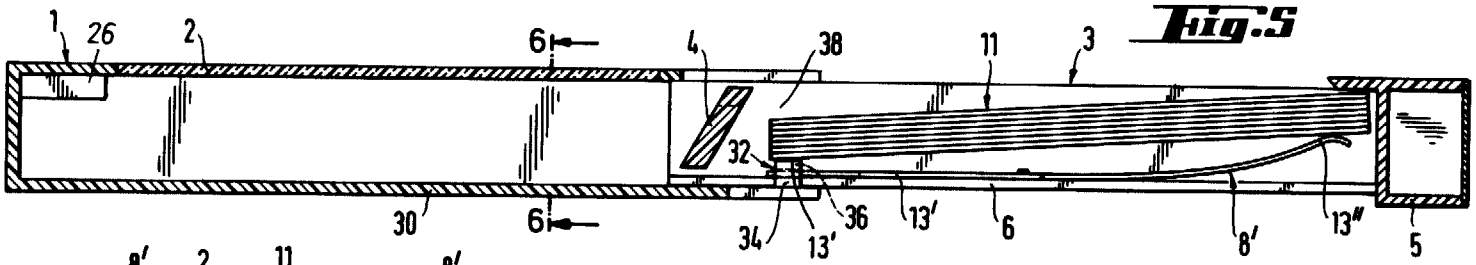
FIG. 5 is a sectional view of the second embodiment of my invention, with the slider moved out of the housing.
Figure 6:
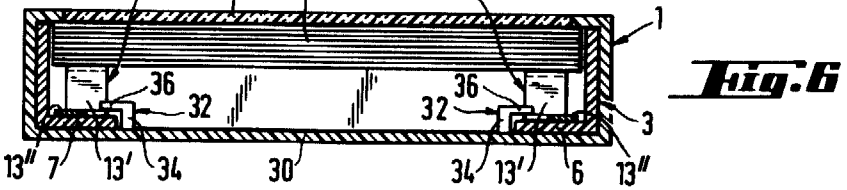
FIG. 6 is a sectional view taken along line 6—6 of FIG. 5, with the slider being moved about halfway into the housing.

FIGS. 4-6 illustrate a modification to the embodiment depicted in FIGS. 1-3 for minimizing the foregoing risks of jamming and resultant damage to the picture. As will be made clear in the discussion below, the modification depicted in FIGS. 4-6 (as well as the embodiment depicted in FIG. 7) includes structure that is also included in the embodiment described above. For the sake of brevity, this common structure and its operation are not described in detail in connection with the descriptions of the embodiments depicted in FIGS. 4-7.

As may be seen in FIG. 4, the configuration of springs 8' have been modified so that the distal end 13' of each spring is offset inwardly with respect to the proximal ends 13" of each spring. Housing bottom 30 includes hooks 32, each having an upstanding base 34 and a laterally outwardly extending arm 36 which extends above slider struts 6 and 7. Clearance is provided between arms 36 and struts 6 and 7 to permit passage of the leaf spring ends 13' when slider 3 is moved out of the housing.

About halfway through the outward stroke of the slider, arms 36 engage over spring ends 13'. The continued outward movement of the slider causes spring ends 13' to be progressively depressed. Consequently, the end of the stack of pictures closest to the housing falls free from the upper wall of the housing on the outward stroke of the slider as depicted in FIG. 5. As a result, when the slider is pushed back into the housing, the leading edge of the separated picture can freely enter into space 38 on top of the stack in the slider. Thus, the risk of the separated picture being jammed or damaged as described above in connection with FIGS. 1-3 is greatly reduced in the embodiment of my invention depicted in FIGS. 4-6.

In contrast to the interaction between arms 36 and spring 13' described above, the lateral extension of arms 36 and spring ends 13" are dimensioned such that arms 36 exert no force on spring ends 13" during reciprocation of the slider into and out of the housing.

Figure 7:
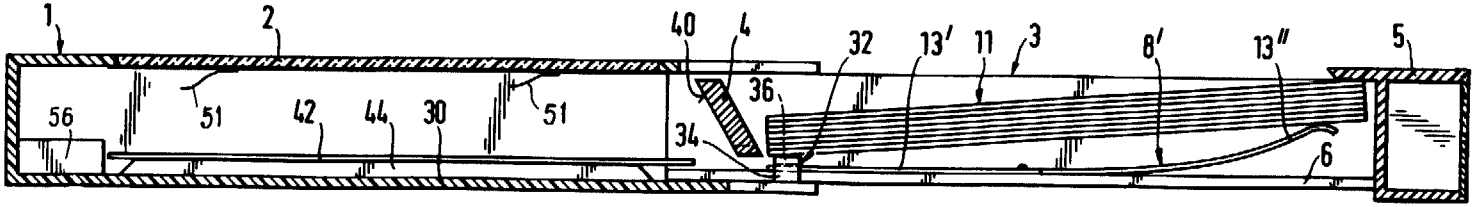
FIG. 7 is a diagrammatic sectional view of a third embodiment of my invention, with the slider moved out of the housing.

FIG. 7 illustrates a further embodiment of my invention in which, unlike the preceding embodiments, the picture immediately beneath the window 2 is retained in the housing 1 when the slider 3 is moved out of the housing. To achieve this result requires a number of modifications to the embodiments described above which will be apparent to persons skilled in the art. For example, the retentive element may take the form of a high friction coating which is deposited around the viewing window of the housing member and which is adapted to engage the marginal edge portions of the top picture during the outward stroke of the slider.

In addition, this embodiment may include relatively weak spring means for pushing the separated picture downwardly during or after withdrawal of the slider. Such spring means may take a variety of forms, e.g., leaf springs mounted in the marginal portions of the housing next to the housing's window as depicted at 51 in FIG. 7.

Other modifications in the FIG. 7 embodiment include providing stop extensions 56 on the bottom of the housing (rather than at its top as described in the previous embodiments) and angling the separator bar 4 in a direction opposite to that depicted in the previous embodiments.

As shown in FIG. 7, when the slider is moved out of the housing to its full extent, the separated picture 42 rests upon rails 44 that project upwardly from the housing's bottom. In its resulting raised position, the bottom of the separated picture may be engaged by spring ends 13' when the slider is pushed back into the housing.

Many details concerning the structure and operation of picture viewers of the general type of my invention are discussed in previously cited U.S. Pat. No. 4,259,802. The disclosure of that patent is incorporated herein by reference.

It is to be understood that while the invention has been described with respect to the preferred embodiments, variations and equivalents thereof may be perceived by those skilled in the art while nevertheless not departing from the scope of my invention as set forth in the claims appended hereto.

I claim:

1. A picture viewer comprising:

(a) a housing member adapted to accommodate a stack of pictures of substantially equal size, the housing member having a top wall provided with a viewing window, a bottom wall opposite the top wall, side walls, a rear wall, and an open front end;

(b) a slider member adapted to slide into and out of the open front end of the housing parallel to the plane of the viewing window of the housing member;

(c) a picture exchange means comprising: (i) a separator bar adapted to move pictures in the stack of pictures out of the housing member when the slider is moved out of the housing member; and (ii) a retentive element in the housing member adapted to engage a first picture in a stack of pictures in the housing member to retain the first picture in the housing member when the slider is moved out of the housing member, the first picture being at a first end of the stack of pictures, whereby, in use, when the slider member is moved out of said housing member, the first picture is separated from the stack of pictures and when the slider member is moved back into the housing member, the first picture is returned to a second end of the stack opposite to the first end; and (d) bias means in the slider member adapted to urge the topmost picture of a stack of pictures in the picture viewer against the viewing window when the slider member is moved into the housing member.

2. A picture viewer as set forth in claim 1 which includes stop means for holding [the corners of] a stack of pictures against the force exerted by the bias means when the slider member is moved out of the housing member.

3. A picture viewer as set forth in claim 2 wherein the stop means comprises part of the housing member and part of the slider member.

4. A picture viewer as set forth in claim 3 wherein said part of the slider member is a [pivotable] *displaceable* stop member which, when the slider member is moved out of the housing member, may be [pivoted] *moved* to an open position to permit insertion and removal of a stack of pictures *respectively* into and out of the slider member.

5. A picture viewer as set forth in claim 4 further including a spring to bias the [pivotable] *displaceable* stop member in its open position.

6. A picture viewer as set forth in claim 1 wherein the bias means comprises a pair of leaf springs, each of the leaf springs being mounted substantially at its center on the slider member.

7. A picture viewer as set forth in claim 6 wherein the slider member has a bottom which comprises a pair of struts and further wherein each strut carries one of the leaf springs.

8. A picture viewer as set forth in claim 7 wherein the leaf springs have first ends which remain in the housing member when the slider member is moved out of the housing member to its full extent.

9. A picture viewer as set forth in claim 1 wherein the retentive element is biased by means of a spring, said spring exerting substantially the same bias irrespective of its deflection.

10. A picture viewer as set forth in claim 1 wherein the retentive element is deflected downwardly by the separator bar when the slider member is moved out of the housing.

11. A picture viewer as set forth in claim 1 wherein the housing member includes stop extensions and a biasing member for urging a separated picture toward the stop extensions when the slider is moved out of the housing member.

12. A picture viewer as set forth in claim 1 wherein the bias means has a first end close to the housing member when the slider member is moved out of the housing member and further wherein the slider member includes disabling means for suppressing the first end of the bias means when the slider member is moved out of the housing member.

13. A picture viewer as set forth in claim 12 wherein: (a) the bias means comprises leaf springs, each leaf spring having a first end close to the housing member when the slider member is moved out of the housing member and a second end remote from the housing member when the slider member is moved out of the housing member, and (b) the disabling means comprises extensions from the housing member which are arranged and constructed to engage over each first end of the leaf springs to suppress that end when the slider member is moved out of the housing member.

14. A picture viewer as set forth in claim 13 wherein the second end of each leaf spring is not suppressed by the disabling means when the slider member is moved out of the housing member.

*15. A picture viewer as set forth in claim 4 wherein said displaceable stop member is pivotably mounted in said slider member.*

*16. A picture viewer as set forth in claim 15 further including a spring for biasing said pivotable stop member in its open position.*

* * * * *

UNITED STATES PATENT AND TRADEMARK OFFICE

CERTIFICATE OF CORRECTION

PATENT NO. : Re. 32,738

DATED : August 30, 1988

INVENTOR(S) : Peter Ackeret

It is certified that error appears in the above-identified patent and that said Letters Patent is hereby corrected as shown below:

Column 3, line 29, after "picture" should be inserted -- viewer --.

Column 4, line 29, "withdrawl" should be -- withdrawal --.

Claim 1, column 6, line 32, after "rear" should be inserted -- end --.

Signed and Sealed this

Thirtieth Day of April, 1991

*Attest:*

HARRY F. MANBECK, JR.

*Attesting Officer*

*Commissioner of Patents and Trademarks*